United States Patent [19]

Jacobs et al.

[11] Patent Number: 5,063,535
[45] Date of Patent: Nov. 5, 1991

[54] PROGRAMMING CONFLICT IDENTIFICATION SYSTEM FOR REPRODUCTION MACHINES

[75] Inventors: Craig W. Jacobs, Fairport; Joseph L. Filion, Rochester, both of N.Y.

[73] Assignee: Xerox Corporation, Stamford, Conn.

[21] Appl. No.: 272,041

[22] Filed: Nov. 16, 1988

[51] Int. Cl.⁵ ............... G06F 15/00; G06F 3/14; G06F 11/08

[52] U.S. Cl. ................... 395/575; 395/109; 395/118; 371/19; 371/16.5

[58] Field of Search .............. 364/200, 900, 518; 340/715; 371/19, 16.4, 16.5, 21.6; 355/204, 205, 206, 207

[56] References Cited

U.S. PATENT DOCUMENTS

| | | | |
|---|---|---|---|
| 3,415,981 | 12/1968 | Smith et al. | 371/19 |
| 3,427,443 | 2/1969 | Apple et al. | 371/19 |
| 4,161,277 | 7/1979 | Steiner | 371/16.4 |
| 4,332,464 | 6/1982 | Bartulis et al. | 355/14 C |
| 4,413,314 | 11/1983 | Slater et al. | 364/188 |
| 4,499,581 | 2/1985 | Miazga et al. | 371/16.4 |
| 4,514,846 | 4/1985 | Federico et al. | 371/16.5 |
| 4,609,919 | 9/1986 | Miyazaki et al. | 340/715 |
| 4,639,881 | 1/1987 | Zingher | 364/521 |
| 4,646,250 | 2/1987 | Childress | 364/518 |
| 4,661,953 | 4/1987 | Venkatesh et al. | 371/16 |
| 4,691,317 | 9/1987 | Miazga et al. | 371/29.1 |
| 4,817,418 | 4/1989 | Asami et al. | 371/29.1 |
| 4,831,526 | 5/1989 | Luchs et al. | 364/401 |
| 4,853,878 | 8/1989 | Brown | 364/521 |
| 4,920,538 | 4/1990 | Chan et al. | 371/19 |
| 4,922,491 | 5/1990 | Coale | 371/16.5 |
| 4,933,880 | 6/1990 | Borgendale | 364/523 |
| 4,956,703 | 9/1990 | Uzuda et al. | 358/76 |

OTHER PUBLICATIONS

Xerox 5700 Electronic Printing System Reference Manual; Sep. 1980; Appendix B; pp. 2-1 to 2-5.

Primary Examiner—Allen R. MacDonald
Assistant Examiner—Ayaz R. Sheikh
Attorney, Agent, or Firm—Frederick E. McMullen

[57] ABSTRACT

Programming conflict identification system for reproduction machines using a color touch screen for inputting programming instructions having a job review window for displaying the programming selections made, a message area in which one conflict message at a time is displayed, and an error table in which programming conflicts are queued, with programming selections corresponding to the currently displayed conflict message highlighted by black text on an amber background, and remaining conflicts highlighted by amber text on a white background.

3 Claims, 13 Drawing Sheets

PROGRAMMING CONFLICT IDENTIFICATION SYSTEM FOR REPRODUCTION MACHINES

BACKGROUND OF THE INVENTION

The invention relates to reproduction machines, and more particularly, to a system for identifying conflicts when programming reproduction machines.

Reproduction machines such as copiers and printers have become faster and more complex and versatile in the jobs they can do, presenting numerous and varied job programming selections numbering in the hundreds. Still, these machines must accommodate various operator skill levels ranging from the dedicated user at one extreme to the casual user at the other extreme.

When programming jobs on machines of this type, and particularly when programming long and complex jobs having many documents to process, it is possible and in some cases likely that programming conflicts will be introduced. This is especially true in cases where the operator lacks experience and training or is a casual operator not totally familiar with the machine. These programming conflicts are particularly common in cases where the job itself calls for special exceptions and features for certain pages in the job which are different from the main job program involving the bulk of the documents.

Where a conflict in the job program occurs and is not detected prior to running the job, the machine stops when it detects the conflict. This, of course, delays the job while the conflict is being corrected. In a high speed production environment handling many jobs, not only is the job being processed delayed but other jobs queued behind the job for processing are delayed. And if several programming conflicts exist, there may result a series of interruptions, further reducing throughput, increasing costs, and operator frustration and irritability.

In this context, the user interface between the machine and the operator, which in essence serves as the conduit for dialogue (i.e., the ability to talk) between operator and machine, becomes particularly important since it can serve not only the programming function but also act as the means for identifying to the user any programming conflicts that have been made before the job is run. One type of user interface admirably suited for this purpose is a touch screen where the various programming selections are displayed in the form of icons or pictograms along with instructional text messages. However, the amount of information that can be reasonably displayed on the limited size screen of a touch screen reduces its ability to identify conflicts, particularly where a substantial number of conflicts have occurred during programming the job. Thus, even where a touch screen with icons and text displays is used, the number and complexity of the conflicts that occur when programming a job may overwhelm the touch screen's limited abilities to identify and display the conflicts.

In the prior art, U.S. Pat. No. 4,646,250 to Childress discloses a data entry system employing a data entry screen in which data that is entered incorrectly is highlighted to provide an indication to the user as to whether or not the data entered is correct or not. And U.S. Pat. No. 4,639,881 to Zingher discloses a data input system for printing machines employing a color monitor in which a diagram of the machine is displayed, with a fault detecting and fixing program which on detection of a fault, displays the fault on the diagram, activates an alarm (where immediate operator attention is required), and provides corrective prompts for remedying the fault condition. Further, U.S. Pat. No. 4,332,464 to Bartulis et al discloses an interactive interface for programming copiers/duplicators employing a touch screen with icon displays representing various program selections. The Bartulis et al patent relates to the Xerox 5700 reproduction machine (Xerox and Xerox 5700 are registered Trademarks of Xerox Corporation) in which the interface provides operator messages identifying contradictory or invalid operator selections as described in pages 2-1 to 2-5 and Appendix B of the "Xerox 5700 Electronic Printing Systems: Reference Manual" (September, 1980). And, in a somewhat non-analogous field, U.S. Pat. No. 4,413,314 to Slater et al discloses a control process for an industrial plant in which a color touch screen with icon display is used for inputting data through touching of selected icons displayed on the screen, the display highlighting on the screen operating parameters that have been in an 'alarm' state.

SUMMARY OF THE INVENTION

The present invention is concerned with an improved method for identifying programming conflicts in a reproduction machine having an interactive data entry system with data entry screen displaying touch active data entry fields for use in programming the machine, comprising the steps of: highlighting by a first mark on the screen each data field which on selection conflicts with at least one previously selected data field; displaying a message on the screen describing one of the conflicts; and highlighting by a second mark those ones of the conflicts which relate to the message.

The invention further relates to a method of identifying conflicts that occur when programming jobs in reproduction machines using an interactive display with touch screen, comprising the steps of: using the touch screen, inputting desired program selections; where a program selection is in error, generating an error message identifying the error; queuing the error message with previous error messages in a message queue table; displaying a preset one of the error messages in the queue table on the screen; displaying a job review window on the screen showing the program selections made to date; for program selections shown in the job review window corresponding to the one error message, highlighting the program selections in the job review window by a first color; for other program selections shown in the job review window corresponding to all other error messages in the queue table, highlighting the other job selections by a second color; for all remaining program selections shown in the job review window without error messages in the queue table, displaying the remaining job selections without highlighting; deleting the one error message from the queue table and from the screen while terminating highlighting of the corresponding program selections in the job window when the one error is corrected; displaying the next one of the error messages in the queue table on the screen while changing highlighting of the corresponding program selections in the job window from the second color to the first color; and repeating the above until all of the error messages in the queue table are corrected.

DETAILED DESCRIPTION OF THE DRAWINGS

For a better understanding of the present invention, reference may be had to the accompanying drawings wherein the same reference numerals have been applied to like parts and wherein.

Figure 13:
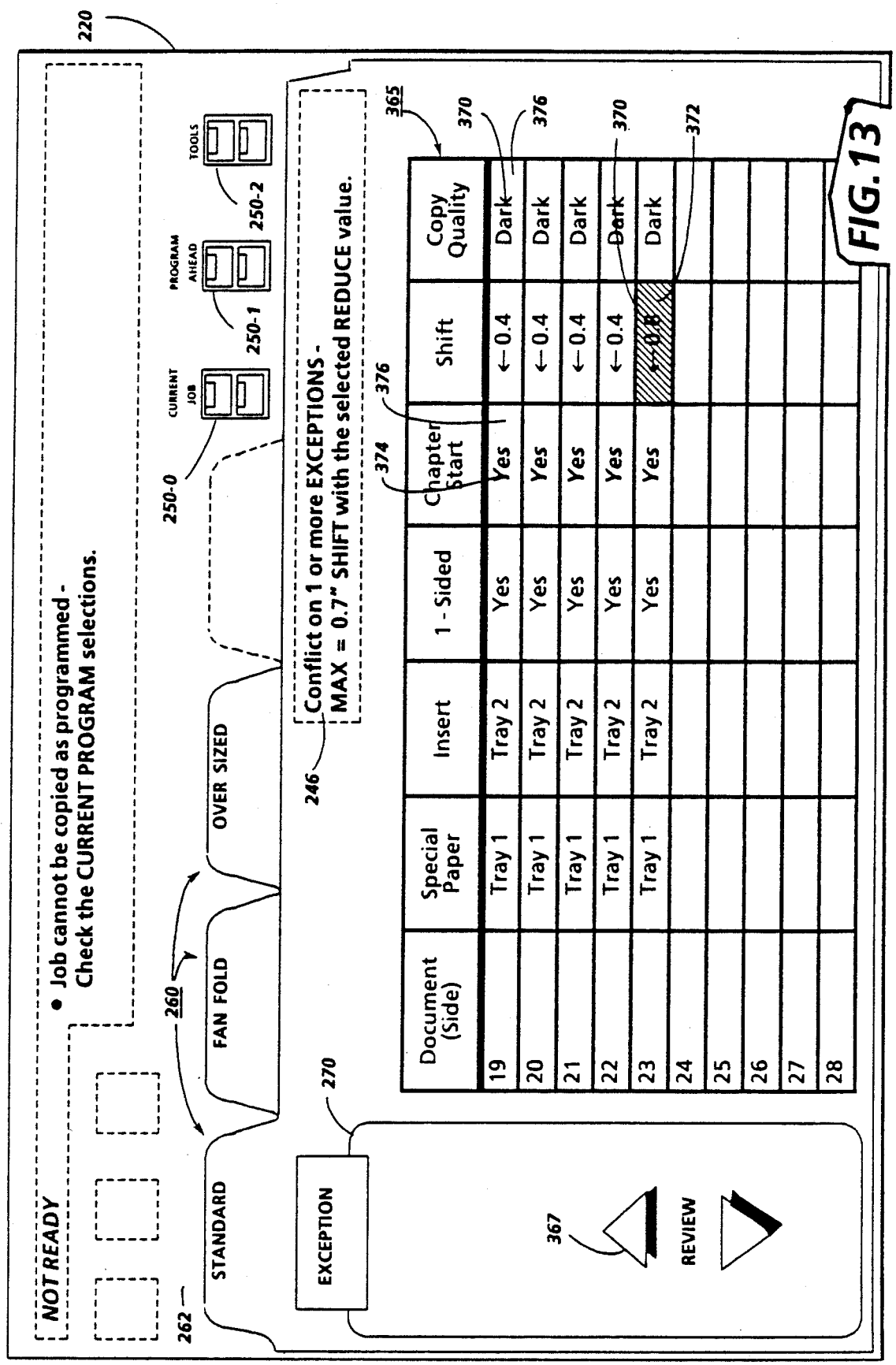
Figure 14:
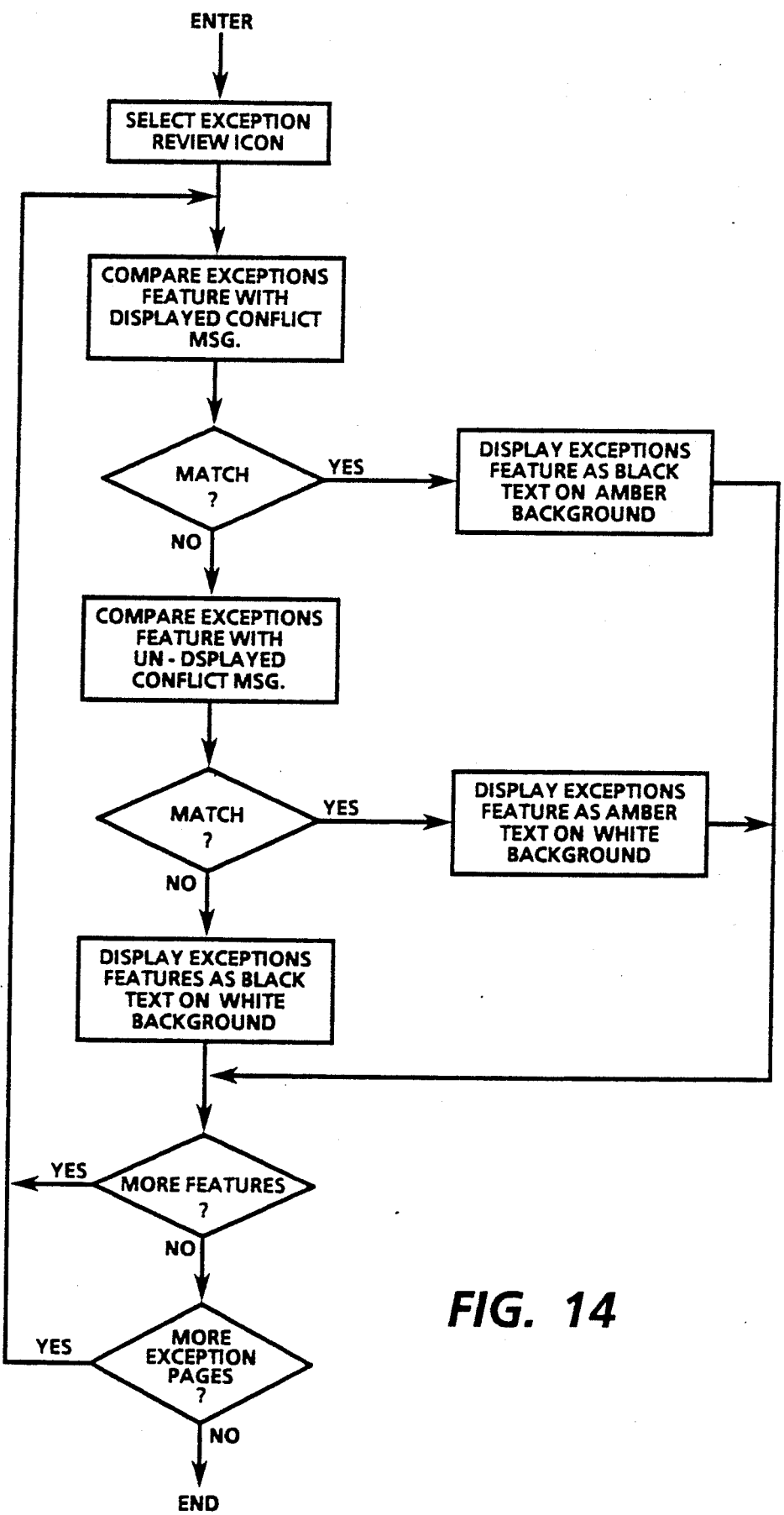

FIG. 13 shows the touch monitor screen with the exception review window displayed and conflicting exception features highlighted; and FIG. 14 is a flow chart illustrating the sequence in which conflicting exception features are highlighted to distinguish those conflicting exception features that relate to the error message currently displayed in the program conflict message area and other conflicting exception features in the error message table.

DETAILED DESCRIPTION OF THE PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
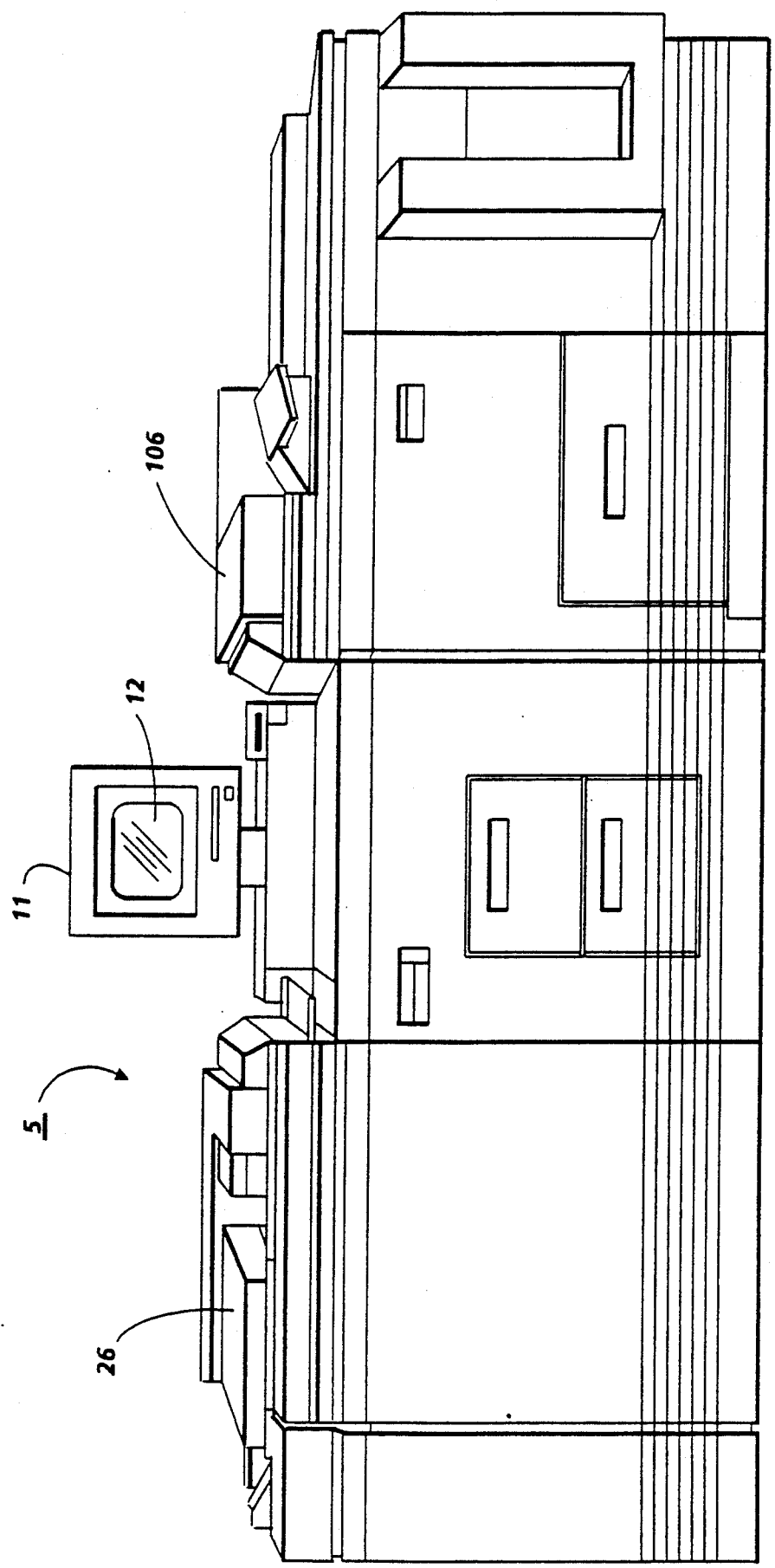
FIG. 1 is an isometric view of an illustrative reproduction machine incorporating the programming conflict identification system of the present invention.
Figure 2:
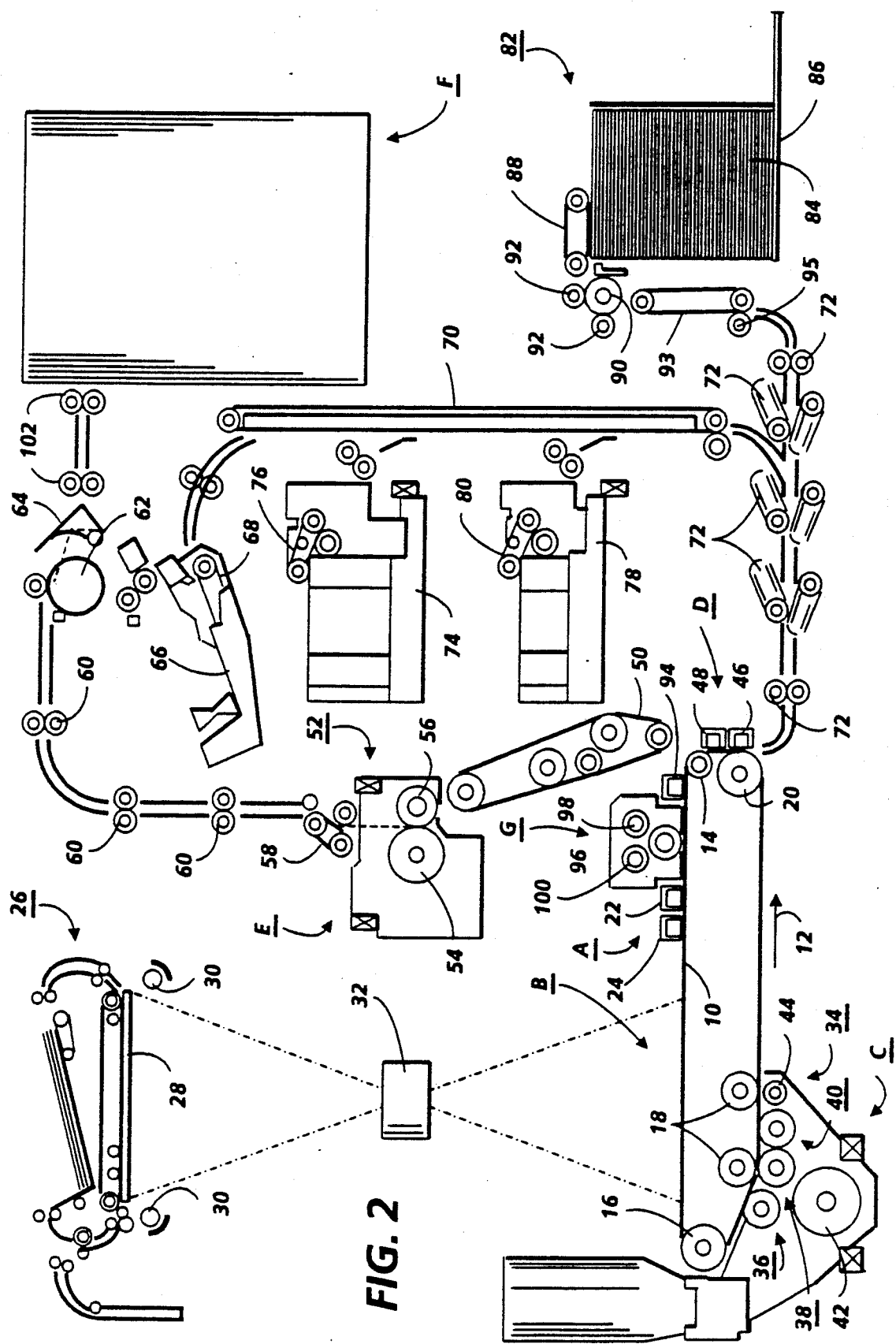
FIG. 2 is a schematic elevational view depicting various operating components and sub-systems of the machine shown in FIG. 1.
Figure 3:
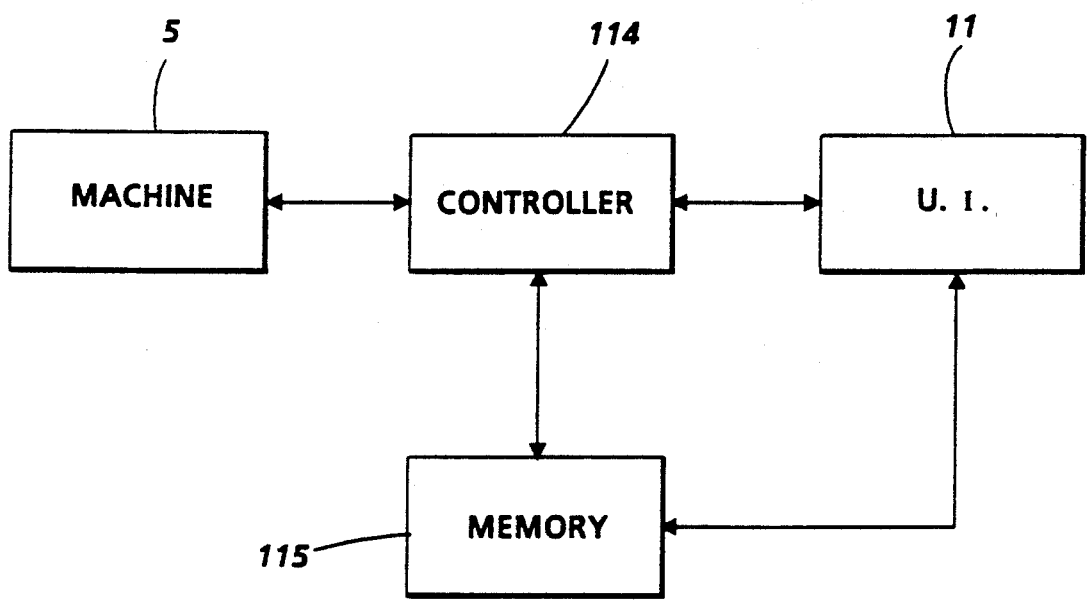
FIG. 3 is a block diagram of the operating control systems and memory for the machine shown in FIG. 1.

For a general understanding of the features of the present invention, reference is made to the drawings. In the drawings, like reference numerals have been used throughout to identify identical elements. Referring to FIGS. 1, 2, and 3, there is shown an electrophotographic reproduction machine 5 composed of a plurality of programmable components and sub-systems which cooperate to carry out the copying or printing job programmed through the touch dialogue User Interface (U.I.) 11.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller 114 which preferably comprises one or more programmable microprocessors. The controller provides a comparison count of the copy sheets, the number of documents being recirculated, the number of copy sheets selected by the operator, time delays, jam corrections, etc. Programming and operating control over machine 5 is accomplished through a U.I. 11. Operating and control information, job programming instructions, etc. are stored in a suitable memory 115 which includes both ROM and RAM memory types, the latter being also used to retain jobs programmed through U.I. 11. And while a single memory is illustrated, it is understood that memory 115 may comprise a series of discrete memories. Conventional sheet path sensors or switches may be utilized to keep track of the position of the documents and the copy sheets. In addition, the controller regulates the various positions of the gates depending upon the mode of operation selected.

Figure 4:
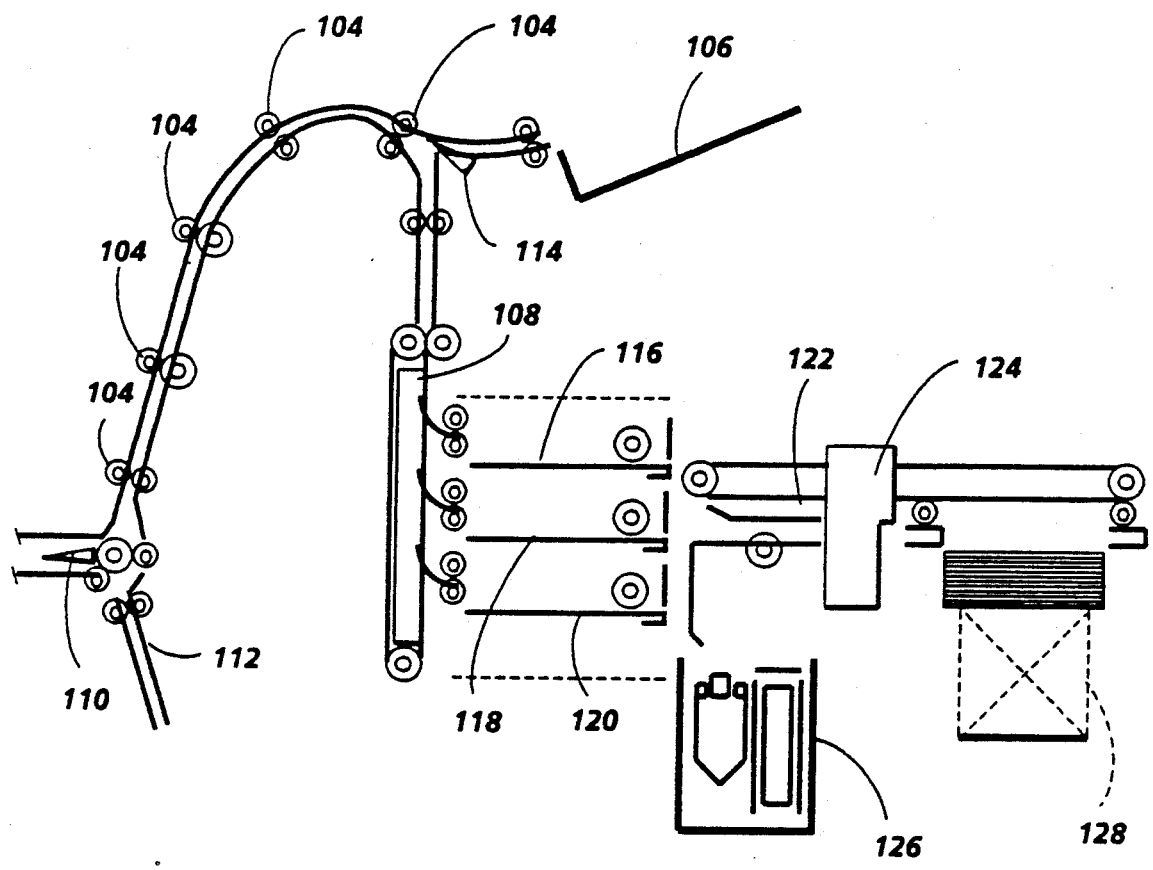
FIG. 4 is a schematic elevational view showing the finishing sub-system of the machine shown in FIG. 1.

Referring now to FIG. 4, finishing station F receives fused copies from rolls 102 (FIG. 2) and delivers them to gate 110. Gate 110 diverts the copy sheet to either registration rolls 104 or inverter 112. Copy sheets diverted to rolls 104 are advanced to gate 114 which diverts the sheets to either the top tray 106 or to vertical transport 108. Transport 108 transports sheets to any one of three bins 116, 118 or 120 which are used to compile and register sheets into sets. The bins are driven up or down by a bidirectional motor adapted to position the proper bin at the unloading position where a set transport 122 having a pair of set clamps is used to grasp and transport sets from the bins to either sheet stapling apparatus 124 when it is desired to staple the sets, or to binder 126 when it is desired to bind the sets, or to stacker 128 when unfinished sets are desired.

Figure 5:
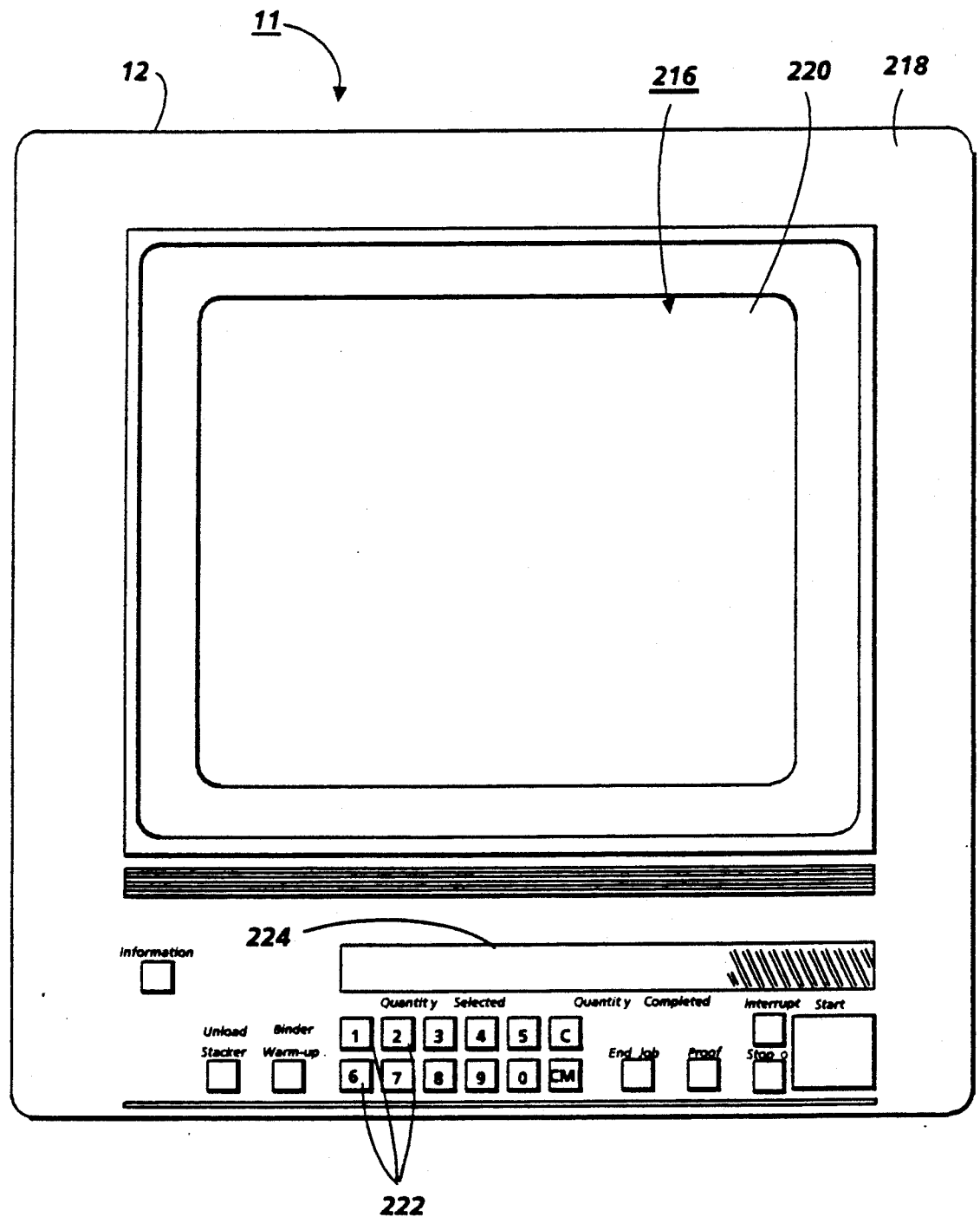
FIG. 5 is a front view of the U.I. color touch monitor showing the soft button display screen and hard button control panel.

Referring to FIG. 5, there is shown the color touch monitor 12 for the touch dialogue U.I. 11. Monitor 12, which provides an operator user interface with hard and soft touch control buttons enabling communication between operator and machine 10, comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms (seen for example in FIG. 7) and messages are displayed as will appear together with a series of hard control buttons 222 and 10 seven segment displays 224 therebelow.

Figure 6:
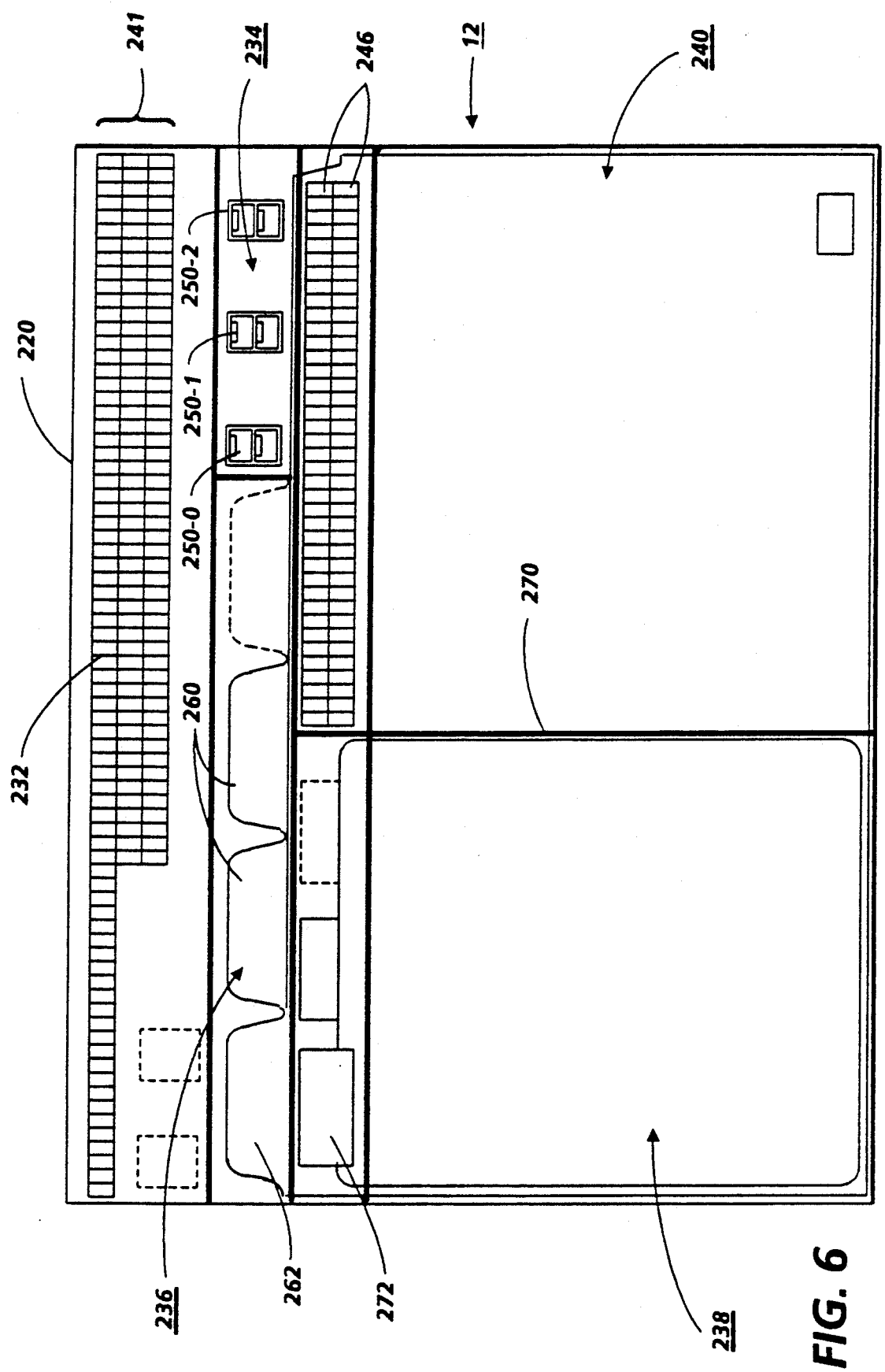
FIG. 6 is a front view of the touch monitor screen with the principal elements of the soft touch dialogue displayed.
Figure 7:
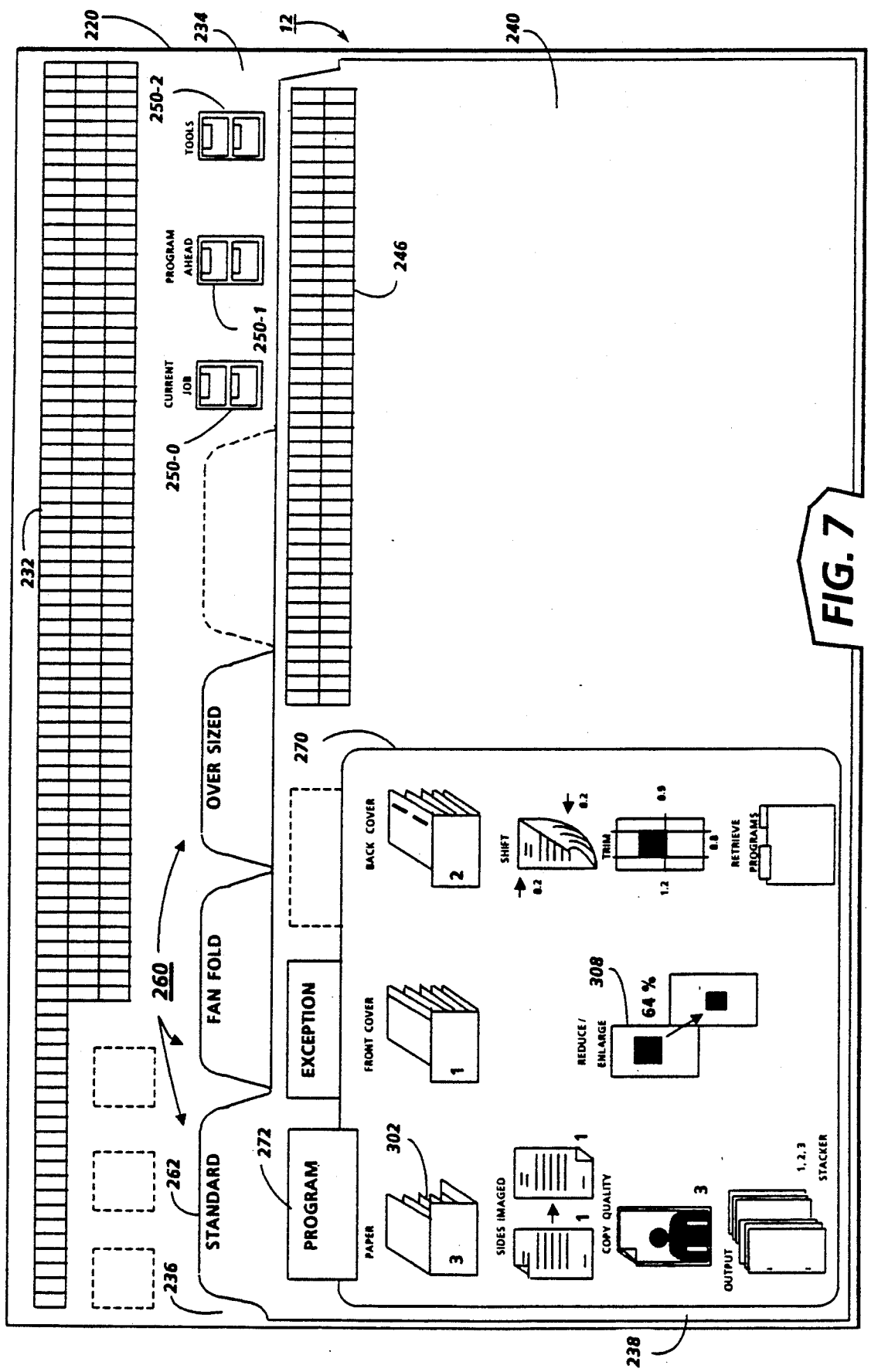
FIG. 7 shows the touch monitor screen display in the CURRENT job mode with the programming icons displayed as a result of touch selection of the STANDARD file folder.

Referring now to FIGS. 6 and 7, for dialogue purposes, screen 220 of monitor 12 is separated into five basic display areas, identified as a message area 232, a dialogue mode selection area 234, a dialogue pathway selection area 236, a scorecard selection area 238, and a work selection area 240.

Message area 232 consists of 3 lines 241 located at the top of screen 220. The dialogue mode selection area 234 comprises an active area containing certain top level dialogue mode controls available to the operator. The mode controls are soft touch buttons 250-0 (CURRENT JOB), 250-1 (PROGRAM AHEAD), and 250-2 (TOOLS) in the form of icons representing file cabinets located on the right side of the screen 220 directly below message area 232.

The dialogue pathway selection area 236 and the scorecard selection area 238 basically simulate a card within a card filing system with primary dialogue pathway file folders 260 and secondary file cards, the latter being referred to as scorecards 270. The dialogue pathway file folders 260 each have an outwardly projecting touch tab 262 along the top edge identifying the dialogue pathway represented by the folder, as for example STANDARD, FANFOLD, OVERSIZED, etc. Scorecards 270, which present the features (first level program selections) available with each of the dialogue pathway file folders 260, have a touch tab 272 displaying the programming pathway options available with the scorecard, such as PROGRAM, EXCEPTION, etc.

Work selection area 240 has program conflict message area 246 reserved for programming conflicts and prompts with the remaining area used for displaying the feature options (second level program selections) available with the first level program selection that is touched on the scorecard currently displayed.

Figure 8:
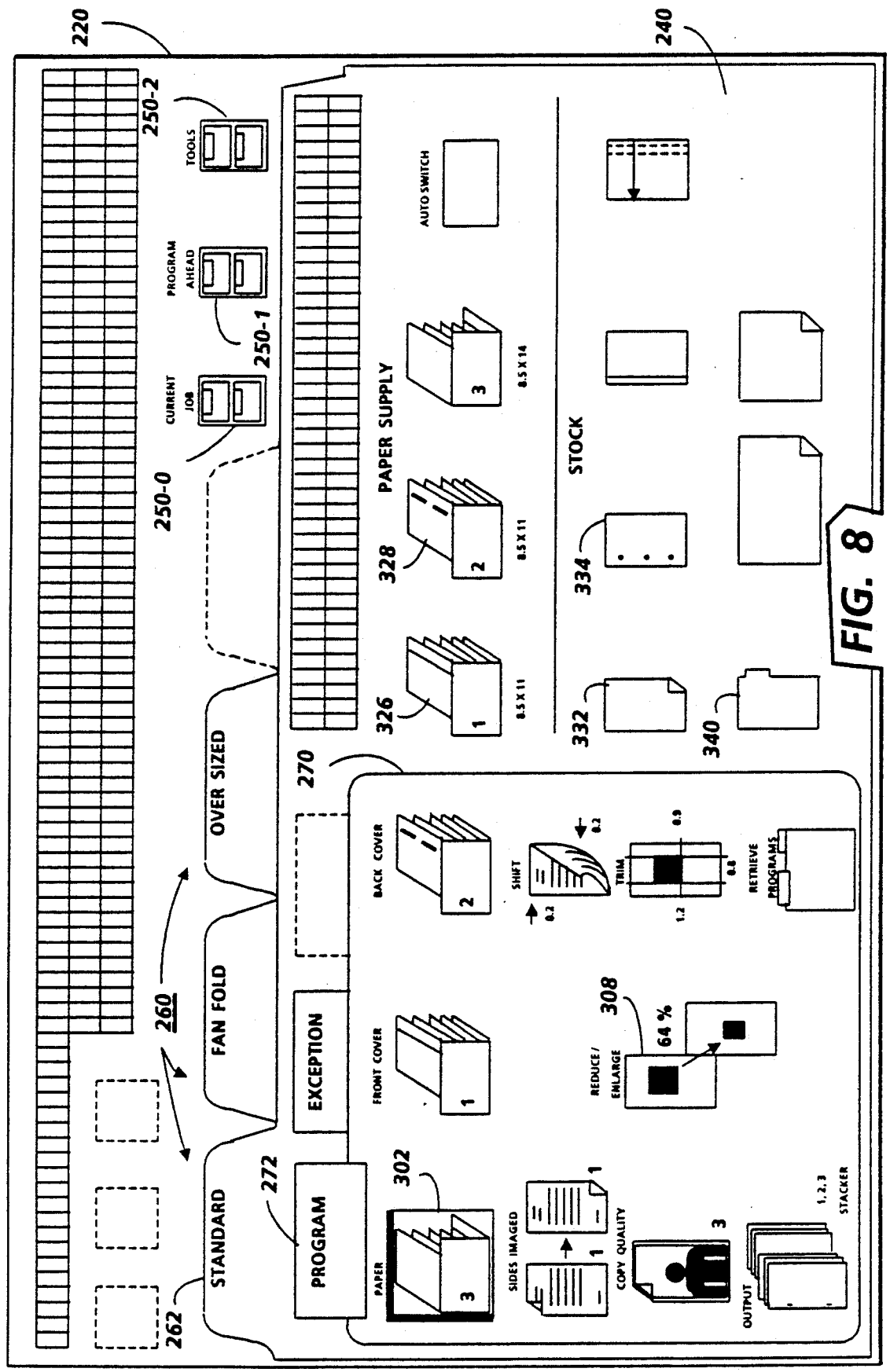
FIG. 8 shows the touch monitor screen with the programming icons displayed as a result of touch selection of the PAPER icon on the PROGRAM scorecard.

Referring particularly to FIG. 8, using touch screen 12 of U.I. 11, the user in order to program a copy or print job for machine 5, touches the CURRENT JOB button 250-0 to display the STANDARD, FAN FOLD, and OVERSIZED file folders 260. By touching the STANDARD tab, the tabs 272 of scorecards PROGRAM, EXCEPTION, etc. are displayed with the programming options available displayed in the form of icons.

Presuming that the user is starting programming the job, the job programming score card is selected by touching the "PROGRAM" tab. As seen in FIG. 8, the program score card 270 contains various primary programming selections such as paper icon 302, reduce/enlarge icon 308, etc. By touching a selected one of the primary programming icons, as for example paper icon 302, the various programming selections in that category are displayed in the form of icons such as PAPER SUPPLY icons 326, 328, etc. and STOCK icons 332, 334, etc. in work selection area 240. By touching selected icons [USER MAKES SELECTION—see FIG. 11] such as the 8.5×11 (tray "2") paper supply icon 328, tab icon 340 for tabbed paper stock, etc., the particular job parameters for the primary programming icon selected are programmed for the job.

Figure 9:
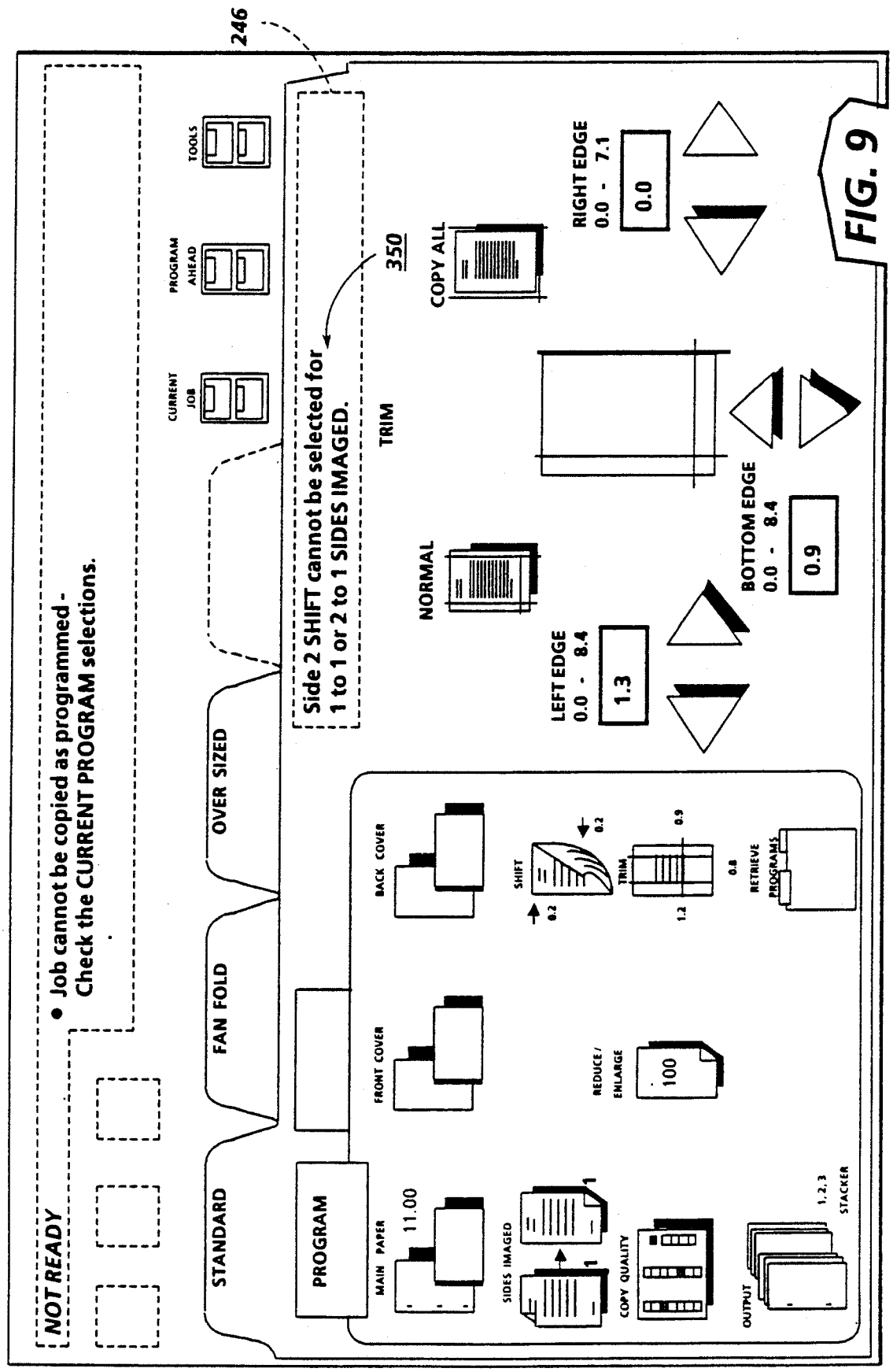
FIG. 9 shows the touch monitor screen with an illustrative error message displayed in the program conflict message area as a result of a programming conflict.
Figure 10:
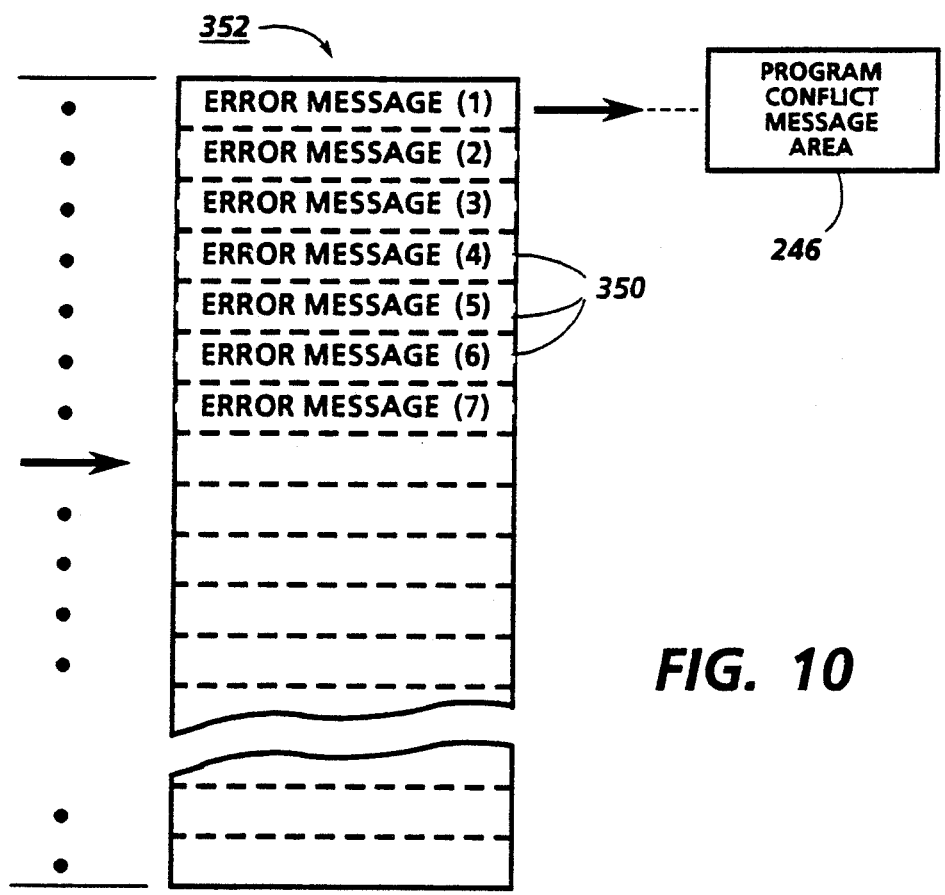
FIG. 10 is a view illustrating the error message table with plural error messages queued therein.
Figure 11:
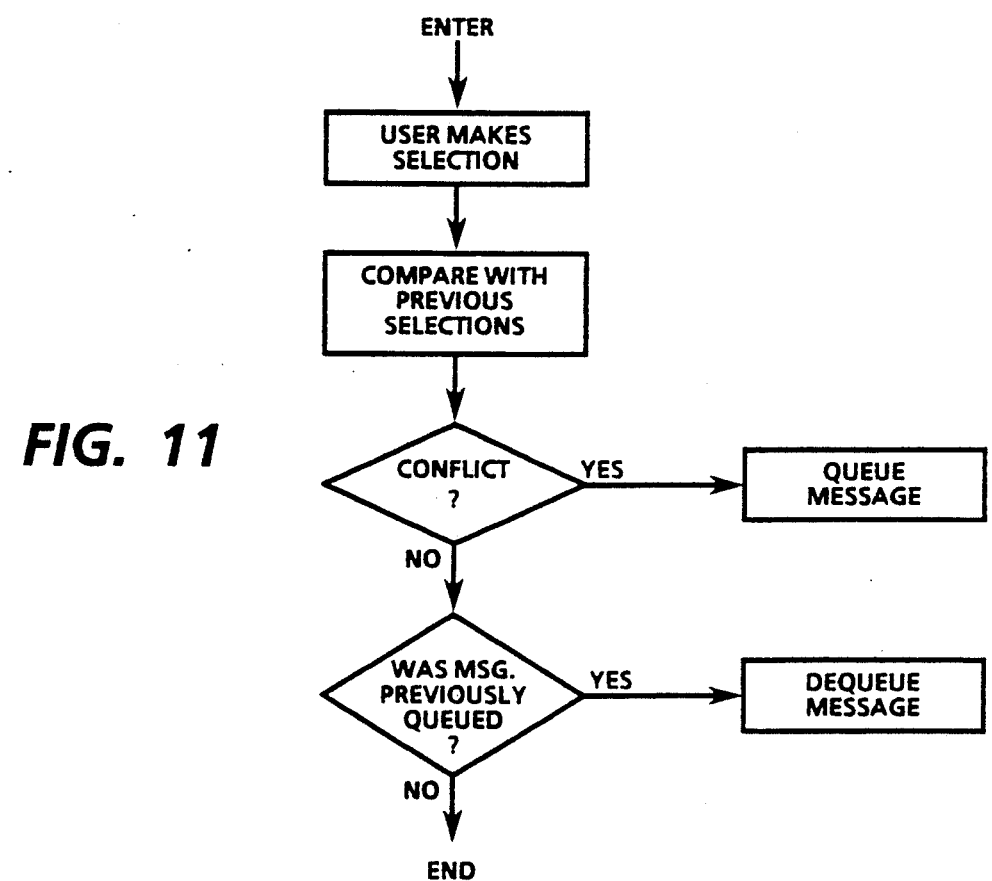
FIG. 11 is a flow chart illustrating the sequence in which error messages are identified and entered into the error message table.

Referring now to FIGS. 9–11, during the aforedescribed job programming selection process, each selection is compared with previous selections [COMPARE WITH PREVIOUS SELECTIONS]. If a selection conflicts with one or more previous selections [CONFLICT?] as for example selecting side 2 image shift where only single side copying (i.e., 1:1 sides) has been selected, an error message 350 is generated and entered into a program error or queue table 352 [QUEUE MESSAGE]. If the error message was previously queued [WAS MSG PREVIOUSLY QUEUED?], the message is not queued a second time [DEQUEUE MESSAGE]. Each error message 350 is entered into table 352 in the order in which the error occurs so that there results, in the event several uncorrected conflicts occur during job programming, a queue of error messages in table 352.

The first error message 350 in the queue of error messages in table 352 is displayed in programming conflict message area 246 identifying to the user the program error that has been made. If the user re-programs and corrects the program conflict error shown in the conflict message area 246, the error message is deleted. If additional error messages are queued in table 352, the next error message in the queue is displayed in conflict message area 246. If there are no other error messages in table 352, conflict message area 246 is blank.

Figure 12:
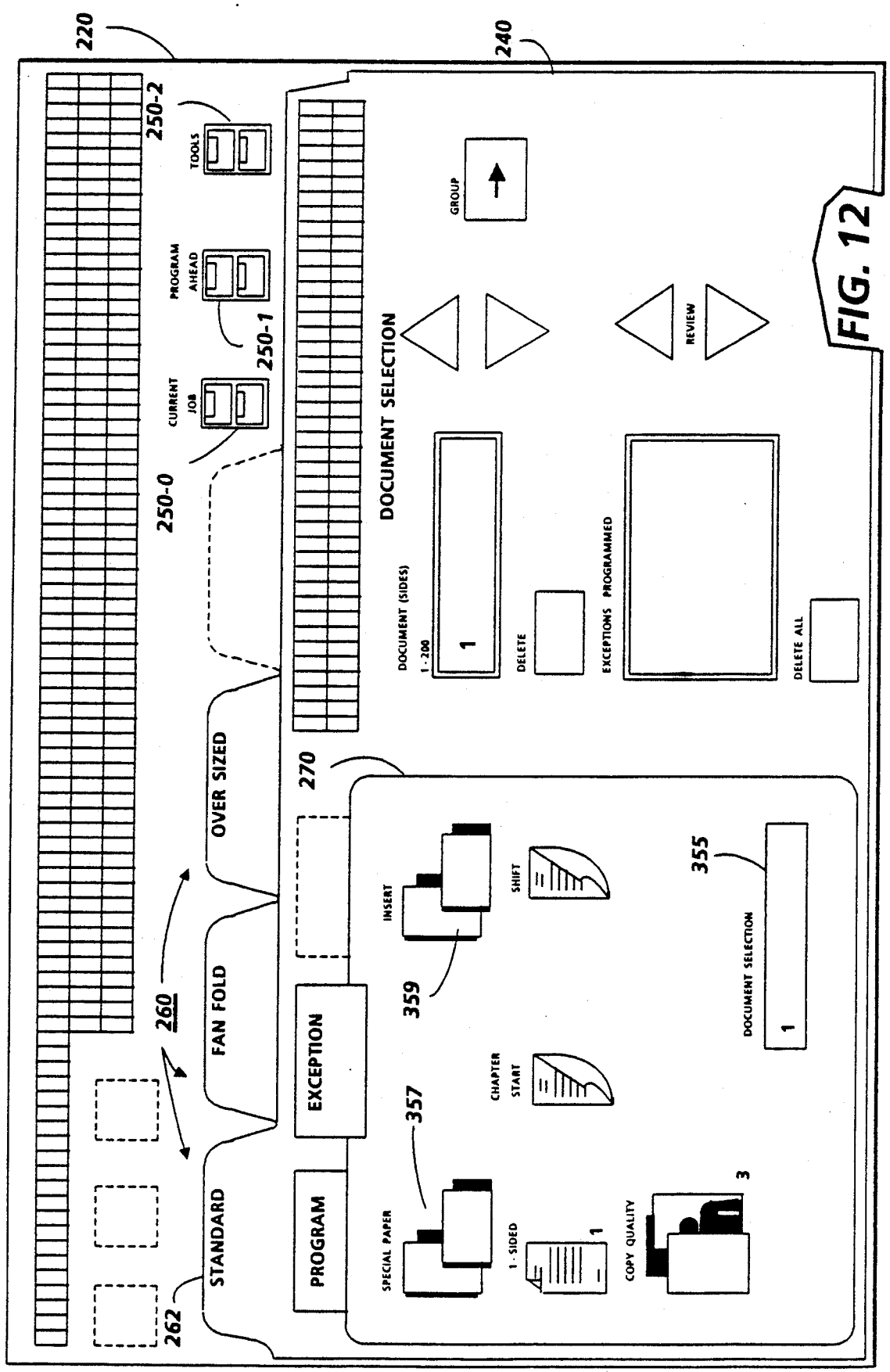
FIG. 12 shows the touch monitor screen with the programming icons displayed as a result of touch selection of the DOCUMENT SELECTION icon on the EXCEPTION scorecard.

Referring particularly to FIG. 12, where special features and exceptions for certain pages in the stack of documents that comprise the job are desired, the exception program score card 270 is accessed. The exceptions score card is brought up by touching the tab labeled EXCEPTION. By touching DOCUMENT SELECT icon 355 of the exception score card and using the program selections associated therewith that are displayed in work area 240, certain documents, document sides, or blocks of documents in the job can be selected for special treatment. By touching other selected ones of the exception icons displayed such as SPECIAL PAPER icon 357, INSERT icon 359, etc., the special programs for the document pages selected can be made.

In the case of exception programming, particularly where the reproduction machine offers a great number of possible selections numbering in the hundreds and the job requires a variety of special features and exceptions, it is usually difficult for the user to remember previous program selections and avoid making selections which conflict with previously made selections. As described, where a conflict occurs, it is entered in the order of occurrence in program error table 352, with the first error message in the queue displayed in program conflict message area 246 of screen 12. When programming long and complex jobs having numerous special features and exceptions, it is usually more efficient to ignore programming conflicts until programming of the job is completed. This is because the number of conflicts that can be identified and corrected at one time is limited since only one conflict message at a time is displayed in conflict message area 246. Further, many attempted conflict corrections introduce new conflicts which then must be resolved.

Referring particularly to FIGS. 13 and 14, to enable job programming errors and conflicts to be identified and dealt with more efficiently, a job table or job review window shown here as exception review window 365 is provided. Window 365 can be accessed at any time during programming of the job or after programming is completed [SELECT EXCEPTION REVIEW ICON]. Exception review window 365 displays by page number and descriptive code all of the exceptions programmed for the job. Since the number of possible exceptions that can be programmed is substantial and exceeds the capacity of window 365 to display all the exceptions at once, a scroll icon 367 is used to scroll review window 365. In the example shown, exception review window 365 is sized to display up to 10 exceptions at once, each exception having up to 6 selections.

Where the error message currently displayed in message area 246 is identified with one or more of the job exceptions displayed in the exception review window 365 [COMPARE EXCEPTIONS FEATURE WITH DISPLAYED CONFLICT MSG.], those job exceptions are visually identified or highlighted by displaying the exceptions in black letters 370 on an amber background 372 [DISPLAY EXCEPTIONS FEATURE AS BLACK TEXT ON AMBER BACKGROUND]. Where additional conflicts with corresponding error messages are queued in table 352 but are not currently displayed in message area 246 [COMPARE EXCEPTIONS FEATURE WITH UN-DISPLAYED CONFLICT MSG.], these job exceptions are visually identified or highlighted by displaying the exception in amber letters 374 on a white background 376 in exception display window 365 [DISPLAY EXCEPTIONS FEATURE AS AMBER TEXT ON WHITE BACKGROUND]. This notifies the user that error messages are currently pending in error table 352 but are not currently displayed. The remaining exceptions displayed in window 365 which are not in conflict and hence do not have error messages pending in error table 352 are displayed in black letters 370 on white background 376 [DISPLAY EXCEPTIONS FEATURE AS BLACK TEXT ON WHITE BACKGROUND].

For each additional job exception [MORE FEATURES?], the foregoing process is repeated until all the exception pages [MORE EXCEPTION PAGES?] have displayed, with the job exceptions highlighted or not highlighted as described. As each conflict is removed by re-programming the job, highlighting of the associated job exception(s), whether by black text on amber background or by amber text on white background is terminated and the exception displayed as black text on white background. Concurrently, the associated error message in program error table 352 is deleted. Where the error message is also displayed in programming conflict message area 246, the error message is deleted and the next error message in the queue of error messages in table 352 displayed. Where all conflicts have been resolved, the job exceptions in review window 365 are displayed by black text on white background.

Appendix A provides the program listings for "Queue Parser" and "Display Mark" [Copyright (©) Xerox Corporation, 1985, 1986, 1987, 1988, All Rights Reserved] routines for the above-described process.

While use of color to highlight conflicts has been described, other forms of highlighting such as pulsing;

flashing; character distinctions as by bolding, italicizing, boxing, etc. may be envisioned. Further, other program selection displays depicting job programming selections with selection conflicts highlighted in accordance with the teachings of the present invention may be envisioned.

While the invention has been described with reference to the structure disclosed, it is not confined to the details set forth, but is intended to cover such modifications or changes as may come within the scope of the following claims.

APPENDIX A

QUEUE PARSER

```
MacroDefs: LOOPHOLE

SetLabel      CNAME
              PROC
LF            DS       0

CF(2)         EQU      $+2
              PEND
*------------------------------------------------
$OS_INTERFACE_ReEnterLOOP CNAME
                          PROC
LF                        DS       0

JMP      LOOPReEntryAddress:
              PEND

END LOOPHOLE MacroDefs;

ReEnterLOOP: OSINTERFACE;

*------------------------------------------------
-- Private Proc to allow listing of Conditional Checks:
ListConditionalChecks: PRIVATE PROCEDURE =
ENTER;
*------------------------------------------------
    LOOPHOLE
        SetLabel,RefNumber539
    END LOOPHOLE;
*------------------------------------------------
IF  (ConflictMsg.LocalExceptionCompositeArray[numOfTray1NonSimplexSpecialPaperExceptions] <> 0)
AND (   (ConflictMsg.stockInTray1 = UiSelect.tabs          )
     OR (ConflictMsg.stockInTray1 = UiSelect.transparency  )
     OR (ConflictMsg.stockInTray1 = UiSelect.lessThanNineInch))
THEN
    compositRegister = compositRegister|tray1NonSimplexSpecialPaperMask;
    IF buildDisplayedMsgRegister
    THEN
        -- We are now looking at the currently displayed message:
        displayedMsgCompositRegister = displayedMsgCompositRegister|tray1NonSimplexSpecialPaperMask;
    END IF;
END IF;

IF  (ConflictMsg.LocalExceptionCompositeArray[numOfTray2NonSimplexSpecialPaperExceptions] <> 0)
AND (   (ConflictMsg.stockInTray2 = UiSelect.tabs          )
     OR (ConflictMsg.stockInTray2 = UiSelect.transparency  )
     OR (ConflictMsg.stockInTray2 = UiSelect.lessThanNineInch))
THEN
    compositRegister = compositRegister|tray2NonSimplexSpecialPaperMask;
    IF buildDisplayedMsgRegister
    THEN
        -- We are now looking at the currently displayed message:
        displayedMsgCompositRegister = displayedMsgCompositRegister|tray2NonSimplexSpecialPaperMask;
    END IF;
END IF;
ReEnterLOOP[];
*------------------------------------------------
    LOOPHOLE
        SetLabel,RefNumber540
    END LOOPHOLE;
*------------------------------------------------
IF  (ConflictMsg.LocalExceptionCompositeArray[numOfTray1GroupedSpecialPaperExceptions] <> 0)
AND (   (ConflictMsg.stockInTray1 = UiSelect.tabs          )
     OR (ConflictMsg.stockInTray1 = UiSelect.transparency  )
     OR (ConflictMsg.stockInTray1 = UiSelect.lessThanNineInch))
THEN
    compositRegister = compositRegister|tray1GroupedSpecialPaperMask;
    IF buildDisplayedMsgRegister
    THEN
        -- We are now looking at the currently displayed message:
        displayedMsgCompositRegister = displayedMsgCompositRegister|tray1GroupedSpecialPaperMask;
    END IF;
END IF;

IF  (ConflictMsg.LocalExceptionCompositeArray[numOfTray2GroupedSpecialPaperExceptions] <> 0)
AND (   (ConflictMsg.stockInTray2 = UiSelect.tabs          )
     OR (ConflictMsg.stockInTray2 = UiSelect.transparency)
     OR (ConflictMsg.stockInTray2 = UiSelect.lessThanNineInch))
```

```
THEN
    compositRegister - compositRegister|tray2GroupedSpecialPaperMask;
    IF buildDisplayedMsgRegister
    THEN
    -- We are now looking at the currently displayed message:
        displayedMsgCompositRegister - displayedMsgCompositRegister|tray2GroupedSpecialPaperMask;
    END IF;
END IF;
ReEnterLOOP[];

---------------------------
    LOOPHOLE
        SetLabel,RefNumber643
    END LOOPHOLE;
---------------------------
    nonCompositRegister - nonCompositRegister|pageTwoChapterStart;
    IF buildDisplayedMsgRegister
    THEN
    -- We are now looking at the currently displayed message:
        displayedMsgNonCompositRegister - displayedMsgNonCompositRegister|pageTwoChapterStart;
    END IF;
    ReEnterLOOP[];

---------------------------
    LOOPHOLE
        SetLabel,RefNumber551
    END LOOPHOLE;
---------------------------
    IF  (ConflictMsg.LocalExceptionCompositeArray[numOfTray1SpecialPaperExceptions] <> 0)
    AND (   (ConflictMsg.ConflictSelectionArray[UiSelect.paperSupplyIndex] = UiSelect.tray1    )
         OR (ConflictMsg.ConflictSelectionArray[UiSelect.paperSupplyIndex] = UiSelect.autoSwitch))
    THEN
        compositRegister - compositRegister|tray1SpecialPaperMask;
        IF buildDisplayedMsgRegister
        THEN
        -- We are now looking at the currently displayed message:
            displayedMsgCompositRegister - displayedMsgCompositRegister|tray1SpecialPaperMask;
        END IF;
    END IF;

IF  (ConflictMsg.LocalExceptionCompositeArray[numOfTray2SpecialPaperExceptions] <> 0)
    AND (ConflictMsg.ConflictSelectionArray[UiSelect.paperSupplyIndex] = UiSelect.tray2 )
    THEN
        compositRegister - compositRegister|tray2SpecialPaperMask;
        IF buildDisplayedMsgRegister
        THEN
        -- We are now looking at the currently displayed message:
            displayedMsgCompositRegister - displayedMsgCompositRegister|tray2SpecialPaperMask;
        END IF;
    END IF;
    ReEnterLOOP[];

---------------------------
    LOOPHOLE
        SetLabel,RefNumber552
    END LOOPHOLE;
---------------------------
    nonCompositRegister - nonCompositRegister|pageTwoTrayOneSpecialPaper|pageTwoTrayTwoSpecialPaper;
    IF buildDisplayedMsgRegister
    THEN
    -- We are now looking at the currently displayed message:
        displayedMsgNonCompositRegister - displayedMsgNonCompositRegister|pageTwoTrayOneSpecialPaper|pageTwoTrayTwoSpecialPaper;
    END IF;
    ReEnterLOOP[];

---------------------------
    LOOPHOLE
        SetLabel,RefNumber556
    END LOOPHOLE;
---------------------------
    nonCompositRegister - nonCompositRegister|pageOneSimplex;
    IF buildDisplayedMsgRegister
    THEN
    -- We are now looking at the currently displayed message:
        displayedMsgNonCompositRegister - displayedMsgNonCompositRegister|pageOneSimplex;
    END IF;
    ReEnterLOOP[];

---------------------------
    LOOPHOLE
        SetLabel,RefNumber556
    END LOOPHOLE;
---------------------------
    [page1Exceptions] - ExceptionAccess.DeterminePageOneAndTwoExceptionValues[];

IF  ((page1Exceptions & ExceptionAccess.pageOneTrayOneSpecialPaper) = ExceptionAccess.pageOneTrayOneSpecialPaper)
    AND (ConflictMsg.ConflictSelectionArray[UiSelect.frontCoverIndex] > UiSelect.frontTrayOneBothSidesImaged)
    THEN
        nonCompositRegister - nonCompositRegister|pageOneTrayOneSpecialPaper;
        IF buildDisplayedMsgRegister
        THEN
        -- We are now looking at the currently displayed message:
            displayedMsgNonCompositRegister - displayedMsgNonCompositRegister|pageOneTrayOneSpecialPaper;
        END IF;
    END IF;

IF  ((page1Exceptions & ExceptionAccess.pageOneTrayTwoSpecialPaper) = ExceptionAccess.pageOneTrayTwoSpecialPaper)
    AND (   (ConflictMsg.ConflictSelectionArray[UiSelect.frontCoverIndex] > UiSelect.noFrontCovers       )
         AND (ConflictMsg.ConflictSelectionArray[UiSelect.frontCoverIndex] < UiSelect.frontTrayTwoNoImaging))
```

```
THEN
    nonCompositRegister ← nonCompositRegister|pageOneTrayTwoSpecialPaper;
    IF buildDisplayedMsgRegister
    THEN
    --.We are now looking at the currently displayed message:
        displayedMsgNonCompositRegister ← displayedMsgNonCompositRegister|pageOneTrayTwoSpecialPaper;
    END IF;
END IF;
ReEnterLOOP[];

--==========================
    LOOPHOLE
        SetLabel,RefNumber557
    END LOOPHOLE;
--==========================
    nonCompositRegister ← allExceptionsConflictMask;
    IF buildDisplayedMsgRegister
    THEN
    -- We are now looking at the currently displayed message:
        displayedMsgNonCompositRegister ← displayedMsgNonCompositRegister|allExceptionsConflictMask;
    END IF;
    ReEnterLOOP[];

--==========================
    LOOPHOLE
        SetLabel,RefNumber624
    END LOOPHOLE;
--==========================
    nonCompositRegister ← nonCompositRegister|pageOneInsert;
    IF buildDisplayedMsgRegister
    THEN
    -- We are now looking at the currently displayed message:
        displayedMsgNonCompositRegister ← displayedMsgNonCompositRegister|pageOneInsert;
    END IF;
    ReEnterLOOP[];

END PROCEDURE ListConditionalChecks;

--================================================
ENTER;
    -- Don't let procedures accessing Conflict Message Queue execute concurrently:
    OS.LockUsing[@queueLock];

compositRegister ← 0;
    nonCompositRegister ← 0;
    displayedMsgCompositRegister ← 0;
    displayedMsgNonCompositRegister ← 0;
    buildDisplayedMsgRegister ← FALSE;

-- LOOP from 0 upto Conflict Queue Current Message Position:
    K: FOR k ← beginningofqueue UPTO conflictCMP
    LOOP
        DisplayedMsg: IF k = conflictCMP
        THEN
            buildDisplayedMsgRegister ← TRUE;
        END IF DisplayedMsg;

I: FOR i ← 0 UPTO (numberOfExProgConflictMsgs - 1)
        LOOP
            ExProgMsgDisplayed: IF ConflictQueue[k] = ExProgConflicts[i]
            THEN
                -- Registers can be built either unconditionaly, or by further conditons being parsed:
                NonConditional: IF BitPatterns[i] <> conditionDependent
                THEN
                    compositRegister ← (compositRegister | BitPatterns[i]);
                    IF buildDisplayedMsgRegister
                    THEN
                    -- We are now looking at the currently displayed message:
                        displayedMsgCompositRegister ← (displayedMsgCompositRegister | BitPatterns[i]);
                    END IF;
                ELSE
                -- Check other conditions which depend on message i, found in conflictQueue @ k:
                    LOOPHOLE
                        LXI    D,ConditionalTable:    * <DE> <- Address of LSB(1st entry in "ConditionalTable:")
                        LHLD   i                      * <HL> <- X,Index into "ConditionalTable:"
                        MVI    H,0                    * <HL> <- 0,Index into "ConditionalTable:"
                        DAD    H                      * <HL> <- 2*i; Word Values in table
                        DAD    D                      * <HL> <- Address of LSB(i-th entry in table)
                        MOV    E,M                    * <E>  <- LSB(Address of i-th entry in table)
                        INX    H                      * <HL> <- Address of MSB(i-th entry in table)
                        MOV    D,M                    * <D>  <- MSB(Address of i-th entry in table)
                        XCHG                          * <HL> <- Address of i-th entry in table
                        PCHL
*                       ConditionalTable:
*                       ====================
ConditionalTable:       EQU  $
                        DW   RefNumber539
                        DW   RefNumber540
                        DW   RefNumber543
                        DW   RefNumber551
                        DW   RefNumber552
                        DW   RefNumber656
                        DW   RefNumber556
                        DW   RefNumber657
                        DW   RefNumber624
```

```
LOOPReEntryAddress:    EQU S+2
                        .......................
              END LOOPHOLE;
            END IF NonConditional;
          END IF ExProgMsgDisplayed;
        END LOOP I;
    END LOOP K;

END PROCEDURE DetermineExceptionConflicts;

--------------------------------------------------

END MODULE MsgDisplayImpl;
```

DISPLAY MARK

```
DisplayMark: PRIVATE PROCEDURE = displayExceptionProgramCounter: CARDINAL;

ENTER; -- DisplayMark
    SwitchTaskIn[displayExceptionProgramCounter];

compositeInfoforFeature = compositeInfoforFeatureTable[featureId];

nonCompositeInfoforFeature = (nonCompositeInfoforFeatureTable[featureId] & originalInfo);

-- If not image shift at 0.
    IF featureId <> 6 THEN

UiPrimitives.itemID = currentTextRootId + featureId;

ELSE -- If image shift at zero.

-- Use image shift offset.
        UiPrimitives.itemID = currentTextRootId + 1;
    END IF;

-- If composite information for this exception is not known.
    IF (NOT compositeInfoValid) THEN -- If information will not be needed because no composite conflicts are displayed.
        IF (MsgDisplay.compositRegister = 0) THEN compositeRegister = 0;

ELSE -- If composite info may be needed.

-- Determine which composites are effected by this exception.
            [compositeRegister] = ExceptionAccess.ManageComposites[nextReviewLine, .report];
            compositeInfoValid = TRUE;
        END IF;
    END IF;

-- If this feature is associated with a conflict.
    IF (((compositeRegister & compositeInfoforFeature) & MsgDisplay.compositRegister) <> 0)
      OR (((nonCompositeInfoforFeature & nonCompositeRegister) & MsgDisplay.nonCompositRegister) <> 0) THEN -- If this feature is associated with the conflict that is currently displayed.
        IF (((compositeRegister & compositeInfoforFeature) & MsgDisplay.displayedMsgCompositRegister) <> 0)
          OR (((nonCompositeInfoforFeature & nonCompositeRegister) & MsgDisplay.displayedMsgNonCompositRegister) <> 0) THEN -- Display text on amber background.
            UiPrimitives.msgID = UiPrimitives.msgID + (conflictOffsets[featureId]);

ELSE -- If this feature is associated with a conflict that is not on the display.

-- Display amber text.
            UiPrimitives.msgID = UiPrimitives.msgID + (2*(conflictOffsets[featureId]));
        END IF;
    END IF;

UiPrimitives.DisplayText[];

SwitchTaskOut[displayExceptionProgramCounter];
END PROCEDURE DisplayMark;

ENTER; -- ExceptionReviewFrame

-- If a new selection has just been made.
        IF (TSLib.iconOperation = .select) AND (TSLib.action = .fingerUp) THEN SELECT TSLib.sensorID FROM -- If up scroller selected.
                CASE = wsicurrentjobstandardexceptionreviewscrollup1:

-- Move review window pointer forward by nine exceptions.
                    index = 0;
                    AdvanceWindow: BLOCK
                    LOOPHOLE
AdvanceWindowLoop:      DS  0
                    END LOOPHOLE;

-- If advancing would not make us point to tail of list.
                        IF displayforwardLinkst[reviewIndex] <> tailOfList THEN
```

```
                    -- Start from next exception.
                    reviewIndex ← displayForwardLinks↑[reviewIndex];

ELSE -- If at bottom of list.

-- Stop looping.
                    EXIT BLOCK AdvanceWindow;
                END IF;

IF (index = 8) THEN
                    EXIT BLOCK AdvanceWindow;
                ELSE
                    index ← index + 1;
                END IF;

-- Jump back to top of loop (and over E7 75)
                LOOPHOLE
                    JMP    AdvanceWindowLoop:+2
                END LOOPHOLE;
            END BLOCK AdvanceWindow;

-- If down scroller selected.
            CASE = waicurrentjobstandardmainexceptionreviewscrolldown1:

-- Move review window pointer back by nine exceptions.
                index ← 0;
                ReverseWindow: BLOCK
                LOOPHOLE
ReverseWindowLoop:     DS    0
                END LOOPHOLE;
                    -- If backing up would not make us point to head of list.
                    IF displayBackwardLinks↑[reviewIndex] <> headOfList THEN -- Start from previous exception.
                        reviewIndex ← displayBackwardLinks↑[reviewIndex];

ELSE -- If at top of list.

-- Stop looping.
                        EXIT BLOCK ReverseWindow;
                    END IF;

IF (index = 8) THEN
                        EXIT BLOCK ReverseWindow;
                    ELSE
                        index ← index + 1;
                    END IF;

-- Jump back to top of loop (and over E7 75)
                    LOOPHOLE
                        JMP    ReverseWindowLoop:+2
                    END LOOPHOLE;
                END BLOCK ReverseWindow;

-- If leaving exception review frame.
            CASE = waicurrentjobstandardexceptionreviewreturn1:

-- Have display manager remove exception review frame.
                TSLib.dialogControl[TSLib.exitExceptionReview] ← TRUE;

END SELECT;
    END IF;

-- If frame needs to be displayed.
    IF (((TSLib.iconOperation = .select) AND (TSLib.action = .fingerUp))
            OR (TSLib.iconOperation = .initialize)
            OR (TSLib.iconOperation = .videoEngineRecovery)
            OR ((TSLib.iconOperation = .reDraw)
                AND (reviewIndex = headOfList)))
        AND (NOT TSLib.dialogControl[TSLib.exitExceptionReview]) THEN -- If review index is not indicating empty list.
        IF reviewIndex <> headOfList THEN -- Parse review window values to see if review index needs to be adjusted.
            nextReviewLine ← displayForwardLinks↑[reviewIndex];

-- Check lines 1 through 9.
            index ← 1;

-- Set up non pre-emptive looping.
            ParseWindow: BLOCK
            LOOPHOLE
TopOfParseLoop2:     DS    0
            END LOOPHOLE;

-- If not at bottom of list.
                IF nextReviewLine <> tailOfList THEN
                    -- Go to next line.
                    nextReviewLine ← displayForwardLinks↑[nextReviewLine];

ELSE -- If at bottom of list.

-- If backing up one exception would not make us point to head of list.
                    IF displayBackwardLinks↑[reviewIndex] <> headOfList THEN -- Backup review index by one exception. Continue looping in case we need to back up more.
                        reviewIndex ← displayBackwardLinks↑[reviewIndex];
                    END IF;
                END IF;
```

```
                IF (index = 9) THEN
                    EXIT BLOCK ParseWindow;
                ELSE
                    index ← index + 1;
                END IF;

-- Jump back to top of loop (and over E7 75)
                LOOPHOLE
                    JMP    TopOfParseLoop2:+2
                END LOOPHOLE;
            END BLOCK ParseWindow;
        END IF;

-- Blank entire review window.
        UiPrimitives.itemID ← exceptionreviewtableblankingbitmap1;
        UiPrimitives.DisplayItem[];

-- Now start displaying review window.

-- Assume we are not at bottom of window.
        reviewWindowAtBottom ← FALSE;

-- Initialize next review line for loop.
        nextReviewLine ← reviewIndex;

index ← 0;
        currentRootId ← exceptionreviewdocumentone0;
        currentTextRootId ← waprexceptionreviewcqone;

-- Set up non pre-emptive looping.
        DisplayWindow: BLOCK
            LOOPHOLE
TopOfDisplayLoop2:   DS    0
            END LOOPHOLE;

exceptionFieldRootId ← currentRootId;

-- If not at end of list.
            IF nextReviewLine <> tailOfList THEN

-- Display next line.
                displayExceptionNumber ← nextReviewLine;

-- Display exception number fast. This is safe since display is always locked when this routine is called.
turboDisplay ← TRUE;
LOOPHOLE
    CallSwitchTask         DisplayExceptionFast
END LOOPHOLE;

compositeInfoValid ← FALSE;

-- Setup original information.

-- If this exception is for original 1.
IF (displayExceptionArray↑[groupLowerOriginalIndex][nextReviewLine] = 1) THEN originalInfo ← original1Info;

-- If this exception also includes original 2.
    IF ((displayExceptionArray↑[groupFlagIndex][nextReviewLine] & groupFlagMask) <> 0)
       AND (displayExceptionArray↑[groupUpperOriginalIndex][nextReviewLine] >= 2) THEN originalInfo ← (original1Info | original2Info);
    END IF;

-- If this exception includes original 2 (but not original 1).
ELSIF (displayExceptionArray↑[groupLowerOriginalIndex][nextReviewLine] = 2) THEN originalInfo ← original2Info;

ELSE -- If this exception does not include original 1 or 2.

originalInfo ← MsgDisplay.allExceptionsConflictMask;
END IF;

-- Display mark for features that are selected.

IF ((displayExceptionArray↑[cqNotAtDefaultIndex][nextReviewLine] & cqNotAtDefaultMask) <> 0) THEN -- Determine message id based on selection.
    tempValue ← RECAST[(displayExceptionArray↑[cqPresetIndex][nextReviewLine] & cqPresetMask), SHORT CARDINAL];
    IF (tempValue <= UiSelect.pasteUp) THEN
        UiPrimitives.msgID ← cqMessageTable[(tempValue - 2)];
    ELSE
        UiPrimitives.msgID ← 11;
    END IF;

featureId ← 0;

LOOPHOLE
        CallSwitchTask       DisplayMark
    END LOOPHOLE;
END IF;

IF ((displayExceptionArray↑[imageShiftNotAtDefaultIndex][nextReviewLine] & imageShiftNotAtDefaultMask) <> 0) THEN -- Determine message id based on selection.
    tempValue ← RECAST[(displayExceptionArray↑[shiftIndex][nextReviewLine] & shiftMask), SHORT CARDINAL];
    [tempValue] ← JobProgramming.ConvertShiftValue[.toScorecardDisplay, tempValue];

-- If zero has been returned.
    IF tempValue = 0 THEN
```

```
        IF UiSelect.displayUnitsInMetric THEN
            UiPrimitives.msgID ← 172;
        ELSE
            UiPrimitives.msgID ← 173;
        END IF;
        featureId ← 6;

ELSE

UiPrimitives.msgID ← tempValue + 3;
        featureId ← 1;

END IF;

LOOPHOLE
        CallSwitchTask    DisplayMark
    END LOOPHOLE;
END IF;

IF ((displayExceptionArray↑[chapterizationIndex][nextReviewLine] & chapterizationMask) <> 0) THEN UiPrimitives.msgID ← 4;

featureId ← 2;

LOOPHOLE
        CallSwitchTask    DisplayMark
    END LOOPHOLE;
END IF;

IF ((displayExceptionArray↑[oneSidedOriginalIndex][nextReviewLine] & oneSidedOriginalMask) <> 0) THEN UiPrimitives.msgID ← 4;

featureId ← 3;

LOOPHOLE
        CallSwitchTask    DisplayMark
    END LOOPHOLE;
END IF;

tempValue ← RECAST[ROTATE[(displayExceptionArray↑[insertIndex][nextReviewLine] & insertMask), 2], SHORT CARDINAL];
IF (tempValue <> UiSelect.tray3) THEN UiPrimitives.msgID ← tempValue + 4;

featureId ← 4;

LOOPHOLE
        CallSwitchTask    DisplayMark
    END LOOPHOLE;
END IF;

tempValue ← RECAST[ROTATE[(displayExceptionArray↑[specialPaperIndex][nextReviewLine] & specialPaperMask), 2], SHORT CARDINAL];
IF (tempValue <> UiSelect.tray3) THEN UiPrimitives.msgID ← tempValue + 4;
        featureId ← 5;

LOOPHOLE
            CallSwitchTask    DisplayMark
        END LOOPHOLE;
    END IF;

-- Determine index of next line.
    nextReviewLine ← displayForwardLinks↑[nextReviewLine];

ELSE -- If at end of list.

-- Terminate looping.
    index ← 9;

END IF;

IF (index = 9) THEN
    EXIT BLOCK DisplayWindow;
ELSE
    index ← index + 1;
    currentRootId ← currentRootId + (exceptionreviewdocumenttwo0 - exceptionreviewdocumentone0);
    currentTextRootId ← currentTextRootId + (waprexceptionreviewcqtwo - waprexceptionreviewcqone);
END IF;

-- Jump back to top of loop (and over E7 75)
LOOPHOLE
    JMP    TopOfDisplayLoop2:+2
END LOOPHOLE;
END BLOCK DisplayWindow;

-- If not reviewing top of list.
IF (reviewIndex <> topOfActiveList) THEN

-- Make scrollers full color.
    UiPrimitives.iconOperator ← fullColorShadowed;

ELSE

-- Make scrollers ghosted.
    UiPrimitives.iconOperator ← ghostedShadowed;

END IF;
```

```
-- If review window is showing top of list.
IF (reviewIndex = topOfActiveList) THEN -- Remove shadow from down scroller.
    UiPrimitives.iconOperator + (UiPrimitives.iconOperator | removeShadowBit);

END IF;

-- Update properties.
UiPrimitives.itemID + waicurrentjobstandardmainexceptionreviewscrolldown1;
UiPrimitives.ModifyIcon[];

-- If review window is showing bottom of list.
    IF (nextReviewLine = tailOfList) THEN -- Remove shadow from up scroller.
        UiPrimitives.iconOperator + (UiPrimitives.iconOperator | removeShadowBit);

ELSE

-- Display up scroller with shadow.
        UiPrimitives.iconOperator + (UiPrimitives.iconOperator & addShadowBit);

END IF;

-- Update properties.
    UiPrimitives.itemID + waicurrentjobstandardexceptionreviewscrollup1;
    UiPrimitives.ModifyIcon[];

-- Display return icon full color with shadow.
    UiPrimitives.iconOperator + fullColorShadowed;
    UiPrimitives.itemID + waicurrentjobstandardexceptionreviewreturn1;
    UiPrimitives.ModifyIcon[];

END IF;
END PROCEDURE ExceptionReviewFrame;
```

We claim:

1. A method for programming a reproduction machine and identifying programming conflicts that occur, comprising:
   a) using an interactive display with touch display screen, inputting desired program selections;
   b) where a program selection error is made, generating an error message;
   c) queuing said error message with other error messages for different programming selections in a predetermined order in an error message queue table;
   d) displaying at least one error message from said queue table on said touch display screen;
   e) selectively displaying a job table on said touch display screen in which the program selections made are displayed;
   f) highlighting the program selections displayed in said job table for said one error message by a first visual identifier;
   g) highlighting the program selections displayed in said job table for other error messages in said queue table by a second visual identifier;
   h) in response to correction of said program selection error;
      1) deleting said one error message from said queue table and from said touch display screen,
      2) terminating highlighting of the program selections for said one error message by said first visual identifier in said job table;
      3) displaying the next error message in said queue table on said touch display screen,
      4) changing highlighting of the program selections displayed in said job table for said next error message from said second visual identifier to said first visual identifier; and
   j) repeating step h until all of said program selection errors are corrected.

2. The method according to claim 1 including:
   a) highlighting the program selections for said one error message by a first color; and
   b) highlighting the program selections for other error messages displayed in said job table by a second color.

3. A method of identifying conflicts that occur when programming jobs in reproduction machines using an interactive display with touch screen, comprising:
   a) using said touch screen, inputting desired program selections;
   b) where a program selection error is made, generating an error message identifying said error;
   c) queuing said error message with previous error messages in a message queue table;
   d) displaying a preset one of said error messages in said queue table on said touch screen;
   e) displaying a job review window on said touch screen in which the program selections made are displayed;
   f) for program selections displayed in said job review window corresponding to said one error message, highlighting said program selections in said job review window by a first color;
   g) for other program selections displayed in said job review window corresponding to all other error messages in said queue table, highlighting said other program selections by a second color;
   h) for all remaining program selections displayed in said job review window without error messages in said queue table, displaying said remaining job selections without highlighting;
   i) deleting said one error message from said queue table and from said touch screen while terminating highlighting of the corresponding program selections in said job window when said one error is corrected;
   j) displaying the next error message in said queue table on said touch screen while changing highlighting of the corresponding program selections in said job window from said second color to said first color; and
   k) repeating steps i and j until all of said error messages in said queue table are corrected.

* * * * *